J. W. FORD.
PISTON RING.
APPLICATION FILED JAN. 27, 1921.

1,411,244.

Patented Mar. 28, 1922.

Inventor:
JOHN W. FORD,
By John H. Bruninga,
His Attorney.

UNITED STATES PATENT OFFICE.

JOHN W. FORD, OF HILLSBORO, ILLINOIS, ASSIGNOR, BY MESNE ASSIGNMENTS, TO SPYRESEAL MANUFACTURING COMPANY, OF ST. LOUIS, MISSOURI, A CORPORATION OF MISSOURI.

PISTON RING.

1,411,244.  Specification of Letters Patent.   Patented Mar. 28, 1922.

Application filed January 27, 1921. Serial No. 440,379.

*To all whom it may concern:*

Be it known that I, JOHN W. FORD, a citizen of the United States, and residing at Hillsboro, Illinois, have invented the new and useful Improvement in Piston Rings, of which the following is a specification.

This invention relates to piston rings, and more particularly to piston rings of the long lap type, in which the ends overlap for a major or extended part of the ring circumference, as distinguished from the short lap type in which the ends overlap for a short distance or only sufficiently to form the joint.

The superiority of the long lap piston ring over the short lap type is primarily due to the fact that the former has a substantially uniform bearing against the cylinder walls, even though its thickness may be uniform. As distinguished from the multi-piece ring, the one-piece long lap ring not only avoids the breaking up of the ring structure into a series of pieces, but the long lap ring does in fact give a better bearing action against the cylinder walls than the multi-piece ring. It must be kept in mind that as far as leakage is concerned, it is of less importance to have a sealed joint between the ends than to have a bearing on the cylinder walls throughout the circumference of the ring. Moreover, piston rings are constructed almost universally of cast iron in order to secure the desired wearing surface although cast iron of itself has a low resilience.

There are two types of long lap piston rings. In one type the ends overlap for about one-half of the ring circumference so that the tips are at diametrically opposite ends. This, however, makes one-half of the ring stiff while the other half is weak. Accordingly not only will the pressure applied to the cylinder walls be uniform, although it is more uniform than the short lap type, but the effect of this construction is that the bearing will really be at diametrically opposite points, leaving free spaces through which leakage can take place. Furthermore, in view of the fact that the tips are at diametrically opposite points and at the ends of a diameter, these tips have a tendency to project radially as the ring expands in the cylinder, with the result that scoring of the cylinder is liable to take place. In another type of ring the ends overlap for nearly the entire ring circumference. This, however, leaves a small amount of metal at the center of the ring so that the stiffness of the ring is reduced to such an extent that sufficient bearing on the cylinder walls cannot be obtained.

One of the objects of this invention, therefore, is to provide a long lap piston ring which is so constructed as to secure maximum uniform bearing on the cylinder walls along the entire ring circumference with maximum resiliency and tension.

Further objects will appear from the detail description taken in connection with the company's drawing, in which Figure 1 is a perspective view of a ring blank embodying this invention;

The ring embodying this invention may be made in various ways, and in accordance with various methods, but in order to understand the construction, one of the methods of making it will be briefly described.

Figure 1:
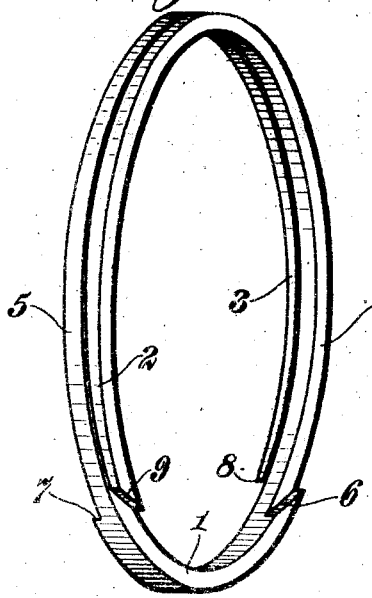
Figure 2:
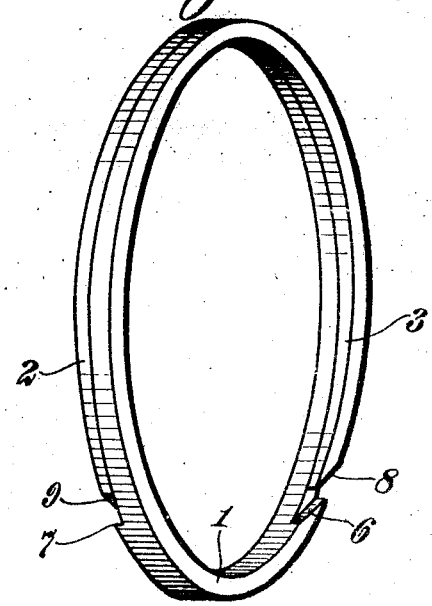
Figure 2 is a similar view showing the ends inverted to overlap so as to lie one within a recess in the other.

Referring to Figure 1, the ring blank has a center part or body 1 provided with ends 2 and 3, which ends are recessed as shown at 4 and 5. In this embodiment, the ends taper from the body portion 1 to the tips and the recesses are tapered correspondingly. The blank may be formed by casting or machining, and the faces of the recesses 4 and 5 as well as the shoulders 6 and 7 and the tips 8 and 9 are accurately formed so as to present the proper surface. The ends 2 and 3 are now inverted as shown in Figure 2, thereby causing one end to lie within a recess in the other and in mutual engagement throughout their parting. The ring blank is then dressed laterally and circumferentially to the proper diameter and width so that when the ring is placed on the piston and in the cylinder, the ring will be contracted to the diameter of the cylinder at which time the tips will practically engage the shoulders. It is, of course, understood that in dressing the ring circumference, it is contracted to its proper diameter so as to present a proper true circle when contracted to its proper diameter in the cylinder for which it is designed.

Figure 3:
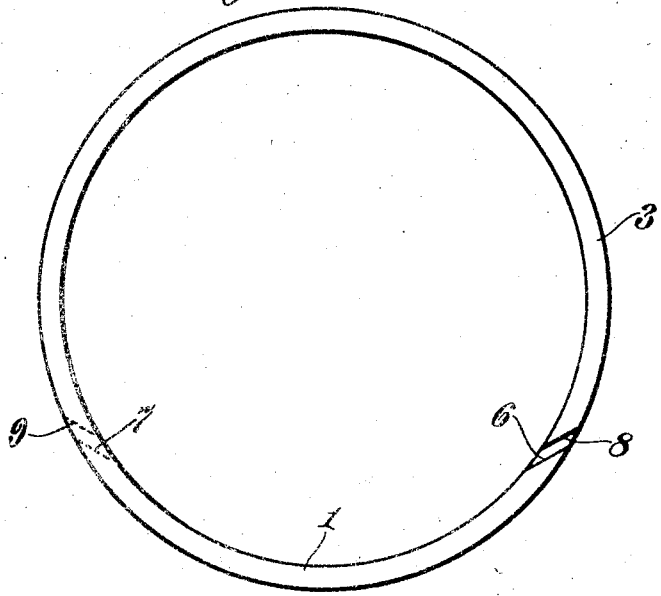
Figure 3 is a side elevation.
Figure 4:
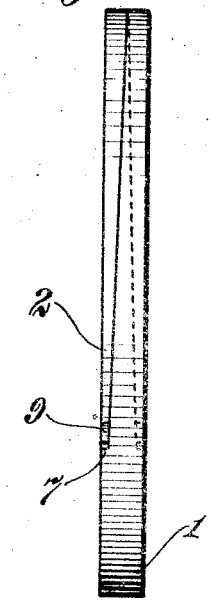
Figure 4 is an edge elevation of the completed ring.

In accordance with this invention the circumferential length of the body portion 1 is about one-third of the ring circumference, so that the ends overlap sidewise so as to jointly engage the cylinder for about two-thirds of the circumference, with these ends lying one within a recess in the other and in mutual engagement throughout their parting as shown in Figures 3 and 4. With this construction it will be seen that the tips overhang the same diameter and extend in the direction of the body portion. Accordingly the diametrical pressure on the extreme ends is considerably removed from the tips so that at no time will there be a tendency of these tips to project beyond the circumference of the ring as it expands in the cylinder, but any expansion will rather cause these tips to move inwardly with respect to the ring circumference. Accordingly scoring of the cylinder is obviated. It will further be seen that while the ring at a given diameter bears against the cylinder walls, the pressure is nevertheless a substantially uniform one, since the ends of the body portion at the shoulders 6 and 7 terminate short of this diameter so that the effect will not be to cause such a great bearing at this diameter as will cause the ring to really assume an elliptical form in the cylinder as is true where these shoulders terminate at the same diameter. However, by leaving sufficient body to the center portion 1, so as to provide a solid body of the ring width for an extended part of the ring circumference, the desired stiffness of the ring is maintained; this is moreover enhanced by tapering the ring ends from the substantial body portion to the ends, since thereby the desired effective pressure is secured. This is important because if the center portion is too weak, then the effective tension due to this center portion will be practically nil on the ring ends. As a matter of fact with the construction described, a substantial three-point bearing is obtained which is very desirable and gives the proper action of a circular ring on a circular bearing wall.

It will, of course, be understood that the length of the center portion need not be exactly one-third of the ring circumference, nor need the ends overlap for exactly two-thirds of the ring circumference; it will further be obvious that various changes may be made in details of construction, within the scope of the appended claims without departing from the spirit of this invention; it is, therefore, to be understood that this invention is not to be limited to the specific details shown and described.

Having thus described the invention, what is claimed is:

1. A long lap piston ring having a solid body of the ring width for about one third of the ring circumference, said body having ends overlapping sidewise so as to jointly engage the cylinder for about two-thirds of the ring circumference, said overlapping ends lying one within a recess in the other and in mutual engagement throughout their parting, whereby the overlapping end tips overhang the same diameter towards the solid body, substantially as and for the purpose set forth.

2. A long lap piston ring having a solid body of the ring width for about one-third of the ring circumference, said body having tapering ends overlapping sidewise so as to jointly engage the cylinder for about two-thirds of the ring circumference, said overlapping ends lying one within a corresponding tapering recess in the other and in mutual engagement throughout their parting, whereby the overlapping end tips overhang the same diameter towards the solid body, substantially as and for the purpose set forth.

In testimony whereof I affix my signature this 17th day of January, 1921.

JOHN W. FORD.